US010155270B2

(12) United States Patent
Aso

(10) Patent No.: US 10,155,270 B2
(45) Date of Patent: Dec. 18, 2018

(54) CUTTING INSERT HAVING A VARIABLE-WIDTH LAND ASSOCIATED WITH GROOVES FORMED IN THE UPPER AND SIDE SURFACES AND INDEXABLE CUTTING TOOL

(71) Applicant: TUNGALOY CORPORATION, Iwaki-shi, Fukushima (JP)

(72) Inventor: Takahiro Aso, Iwaki (JP)

(73) Assignee: TUNGALOY CORPORATION, Iwaki-shi, Fukushima (JP)

( * ) Notice: Subject to any disclaimer, the term of this patent is extended or adjusted under 35 U.S.C. 154(b) by 107 days.

(21) Appl. No.: 15/326,737

(22) PCT Filed: Jul. 30, 2015

(86) PCT No.: PCT/JP2015/071716
§ 371 (c)(1),
(2) Date: Jan. 17, 2017

(87) PCT Pub. No.: WO2016/017780
PCT Pub. Date: Feb. 4, 2016

(65) Prior Publication Data
US 2017/0216940 A1 Aug. 3, 2017

(30) Foreign Application Priority Data
Jul. 31, 2014 (JP) .................. 2014-156185

(51) Int. Cl.
*B23C 5/20* (2006.01)
*B23C 5/10* (2006.01)

(52) U.S. Cl.
CPC ............ *B23C 5/207* (2013.01); *B23C 5/109* (2013.01); *B23B 2200/3654* (2013.01);
(Continued)

(58) Field of Classification Search
CPC .......... B23C 2200/128; B23C 2200/12; B23C 2200/125; B23C 2200/0411; B23C 2200/205; B23C 5/207
See application file for complete search history.

(56) References Cited

U.S. PATENT DOCUMENTS

| 5,549,424 A | 8/1996 | Bernadic et al. |
| 2008/0260476 A1* | 10/2008 | Ishida .................. B23C 5/06 407/114 |

(Continued)

FOREIGN PATENT DOCUMENTS

| JP | 2006-305716 A | 11/2006 |
| JP | 2007-210090 A | 8/2007 |
| JP | 2013-230513 A | 11/2013 |

OTHER PUBLICATIONS

International Search Report dated Oct. 13, 2015 issued in counterpart International (PCT) Application (No. PCT/JP2015/071716).
(Continued)

*Primary Examiner* — Will Fridie, Jr.
(74) *Attorney, Agent, or Firm* — Studebaker & Brackett PC

(57) ABSTRACT

A cutting insert (1) has a first end surface (2); a second end surface (3) opposing the first end surface; and a peripheral side surface (4) connecting the first and second end surfaces. A cutting edge (6) extends along an intersecting edge between the first end surface and the peripheral side surface. A land (20) is formed in the first end surface and extends along the cutting edge. At least one groove (18) is formed in the peripheral side surface, each groove forming an opening in the first end surface and separating the cutting edge into a plurality of portions. In a plan view of the first end surface, a portion of the land adjacent to an end area (S) of the
(Continued)

groove, has a greater width than a width of a portion of the land which is distant from the groove.

15 Claims, 18 Drawing Sheets

(52) U.S. Cl.
CPC . *B23C 2200/0411* (2013.01); *B23C 2200/128* (2013.01); *B23C 2200/205* (2013.01); *B23C 2210/287* (2013.01)

(56) References Cited

U.S. PATENT DOCUMENTS

| | | | | |
|---|---|---|---|---|
| 2009/0188356 A1* | 7/2009 | Ishida | ................. | B23C 5/06 83/53 |
| 2010/0092253 A1* | 4/2010 | Ishida | ................. | B23C 5/06 407/42 |
| 2010/0179555 A1* | 7/2010 | Ishida | ................. | B23C 5/06 606/79 |
| 2010/0247252 A1* | 9/2010 | Hatta | ................. | B23C 5/109 407/42 |
| 2011/0027027 A1* | 2/2011 | Hatta | ................. | B23C 5/109 408/1 R |
| 2011/0070038 A1* | 3/2011 | Ishida | ................. | B23C 5/06 407/42 |
| 2011/0081210 A1* | 4/2011 | Ishida | ................. | B23C 5/207 407/42 |
| 2011/0135406 A1* | 6/2011 | Ishida | ................. | B23C 5/06 407/40 |
| 2011/0135407 A1* | 6/2011 | Koga | ................. | B23C 5/06 407/40 |
| 2011/0170963 A1* | 7/2011 | Smilovici | ................. | B23C 5/06 407/42 |
| 2011/0211926 A1* | 9/2011 | Ishida | ................. | B23C 5/06 409/131 |
| 2012/0034041 A1* | 2/2012 | Koga | ................. | B23C 5/06 407/103 |

OTHER PUBLICATIONS

Written Opinion dated Oct. 13, 2015 issued in counterpart International (PCT) Application (No. PCT/JP2015/071716).

* cited by examiner

CUTTING INSERT HAVING A VARIABLE-WIDTH LAND ASSOCIATED WITH GROOVES FORMED IN THE UPPER AND SIDE SURFACES AND INDEXABLE CUTTING TOOL

RELATED APPLICATIONS

This is a 371 US National Phase of International Patent Application No. PCT/JP2015/071716, filed Jul. 30, 2015, and published as WO 2016/017780A1 on Feb. 4, 2016, which claims priority to Priority: JP 2014-156185, filed Jul. 31, 2014. The contents of the aforementioned applications are incorporated by reference in their entirety.

TECHNICAL FIELD

The present invention relates to a cutting insert and an indexable cutting tool and particularly relates to a cutting insert in which cutting edges are provided with nicks and an indexable cutting tool comprising a body on which such cutting inserts are removably mounted.

BACKGROUND ART

There is a conventional cutting insert in which cutting edges are formed with nicks. For example, the cutting insert in Patent Document 1 is for rotary cutting, and this cutting insert is provided, in a side surface thereof, with a plurality of grooves (hereinafter referred to as "nicks") so as to separate a major cutting edge thereof into portions. Since such nicks separate the major cutting edge into portions, chips which are to be discharged via cutting by the major cutting edge can be made smaller, whereby cutting resistance during cutting can be reduced.

CITATION LIST

Patent Document

Patent Document 1: JP2006-305716 A

SUMMARY

Technical Problem

However, the cutting insert with nicks which is disclosed in Patent Document 1 has the following problem. A connecting part between each nick and each cutting edge has a protruding shape with an acute angle, and such part has a lower strength than that of the other portion. Accordingly, the provision of nicks may impair fracture resistance of the cutting edges, resulting in a reduction in the life of the cutting insert.

The present invention has been devised in order to solve the above problem and has an object to enhance, in a cutting insert in which cutting edges thereof are provided with nicks, fracture resistance of the cutting edges.

Solution to Problem

An aspect of the present invention provides a cutting insert, comprising: a first end surface; a second end surface opposing the first end surface; a peripheral side surface connecting the first end surface and the second end surface; a cutting edge extending along an intersecting edge between the first end surface and the peripheral side surface; a land formed in the first end surface so as to extend along the cutting edge; and at least one groove formed in the peripheral side surface, each groove forming an opening in the first end surface and being formed so as to separate the cutting edge into a plurality of portions, wherein, when the cutting insert is viewed from a direction facing the first end surface, the land is formed such that a portion of the land which is adjacent to an end area of the groove has a greater width than a width of a portion of the land which is distant from the groove.

According to the above aspect of the present invention, the land formed in the first end surface of the cutting insert is formed such that a portion thereof which corresponds to a connecting portion (the end area) between the cutting edge and the nick has a greater width than that of a portion thereof which is distant from the groove. Accordingly, the end area of the groove is strengthened in an effective manner. Further, a portion of the land—which is formed so as to be adjacent to the cutting edge—which is distant from the groove can be made to have a relatively small width which does not impair the cutting ability. Thus, according to the aspect of the present invention, the cutting edge can be strengthened with no reduction in the cutting ability.

Preferably, the first surface has a substantially polygonal shape and comprises a plurality of corners. In such case, when the cutting insert is seen from a side view, the intersecting edge between the first end surface and the peripheral side surface comprises an inclined cutting edge portion which extends between the two adjacent corners and which is inclined so as to be closer to the second end surface from, from among the two corners, one corner to the other corner, and the at least one groove is formed so as to separate the inclined cutting edge portion into a plurality of portions. Preferably, the end area includes an end of the opening which forms an acute angle with the inclined cutting edge portion when the cutting insert is seen from a side view.

Preferably, when viewed from the direction facing the first end surface, the first end surface forms a substantially n-gonal shape and has a shape of n-fold rotational symmetry (where n is an integer of 3 or higher).

Preferably, the intersecting edge between the first end surface and the peripheral side surface is provided with at least two cutting edges including a first cutting edge and a second cutting edge. The at least one groove in the first cutting edge and the at least one groove in the second cutting edge may be asymmetric around an axis extending in an insert thickness direction which is defined so as to intersect with both the first end surface and the second end surface.

Another aspect of the present invention provides an indexable cutting tool, comprising a tool body comprising at least one insert mounting seat, wherein the cutting insert is removably mounted on the insert mounting seat.

Preferably, the tool body has a substantially cylindrical shape and comprises, at a leading end part of the tool body in a direction of an axis, a plurality of insert mounting seats, and, when the tool body is rotated around the axis, a combined trajectory formed by combining rotational trajectories of cutting edges of a cutting insert mounted on each of the insert mounting seats passes through an outermost part of the groove of the cutting insert or extends outside the groove.

Preferably, when a cutting insert is configured such that the intersecting edge between the first end surface and the peripheral side surface is provided with at least two cutting edges including a first cutting edge and a second cutting edge and such that the at least one groove in the first cutting edge and the at least one groove in the second cutting edge are asymmetric around an axis extending in an insert thickness direction which is defined so as to intersect with both the first end surface and the second end surface, the tool body comprises a first insert mounting seat and a second insert mounting seat on each of which the above cutting insert is mounted. The cutting insert is mounted on the first insert mounting seat such that the first cutting edge serves as an active cutting edge, and the cutting insert is mounted on the second insert mounting seat such that the second cutting edge serves as an active cutting edge.

DESCRIPTION OF EMBODIMENTS

Figure 1:
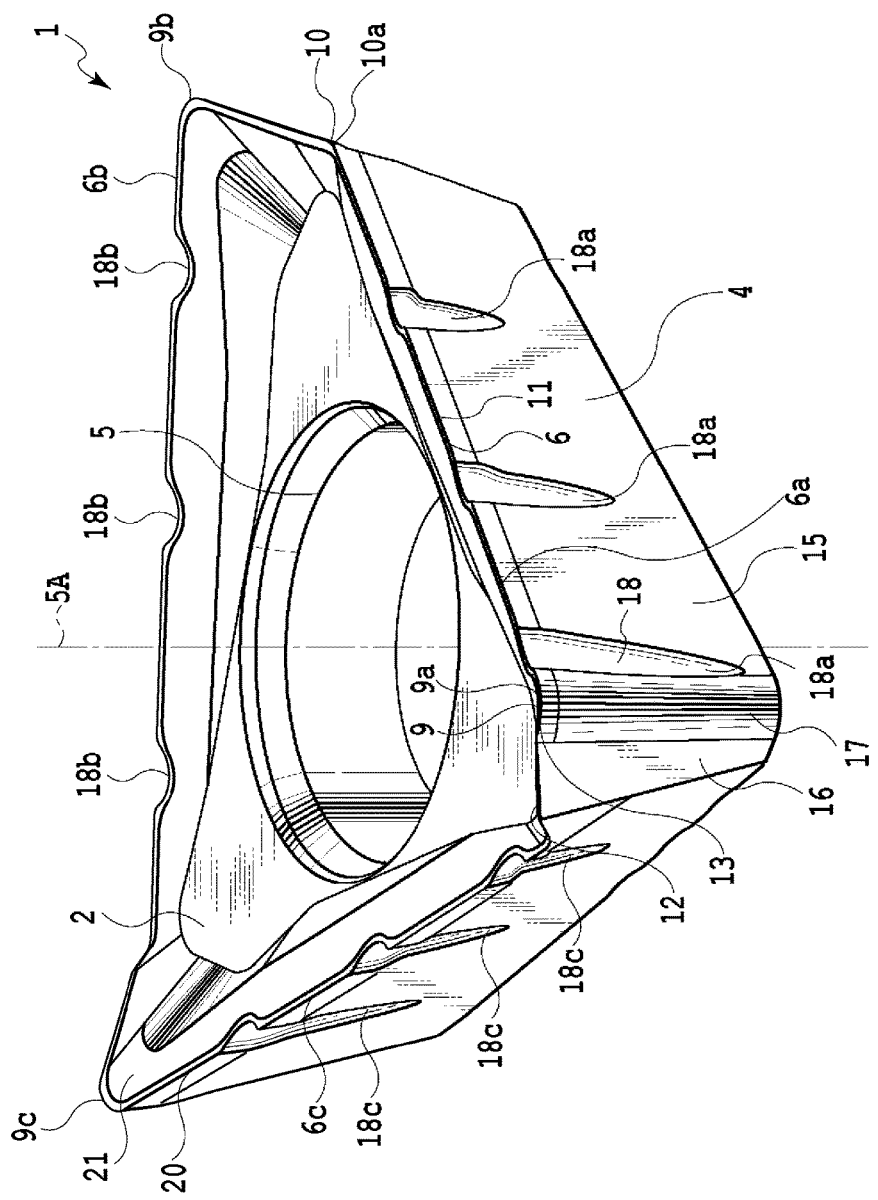
FIG. 1 is a perspective view showing a cutting insert according to an embodiment of the present invention.
Figure 2:
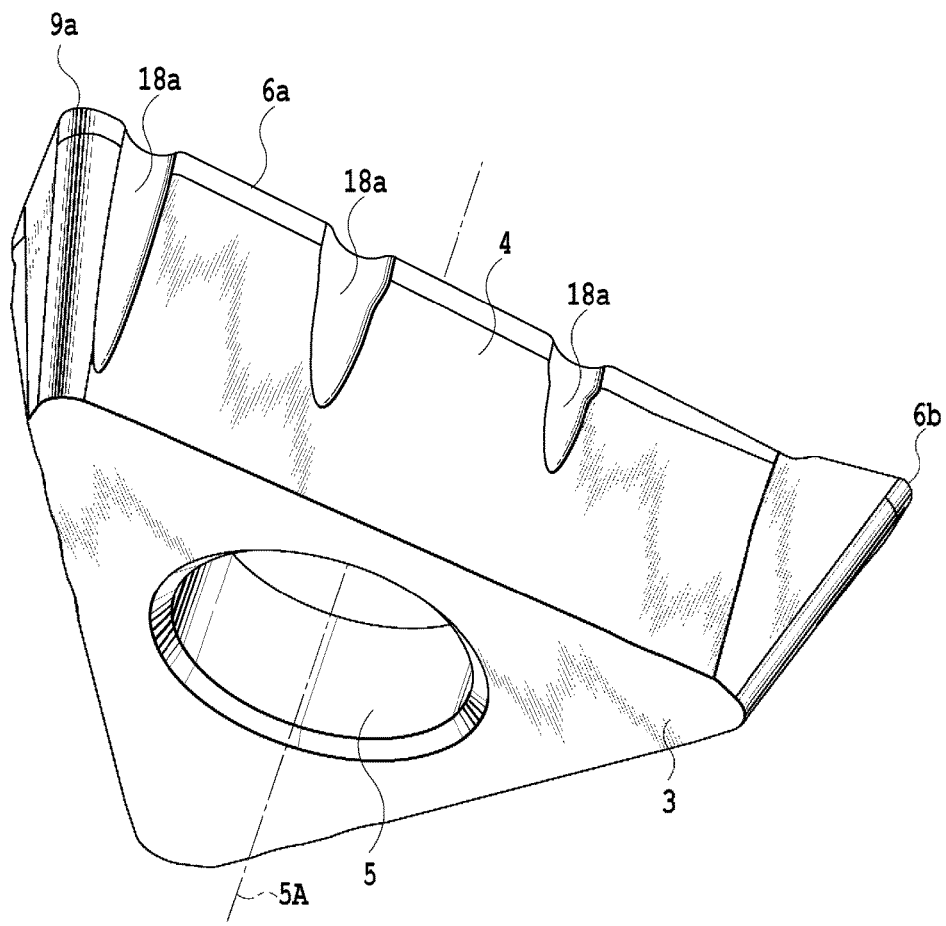
FIG. 2 is a perspective view of the cutting insert of FIG. 1 which is viewed from another angle.

An embodiment of the present invention will hereinafter be described with reference to the attached drawings.

A cutting insert 1 according to the present embodiment includes two opposing end surfaces 2, 3 and a peripheral side surface 4 connecting such two end surfaces, as shown in FIGS. 1 to 4. Hereinafter, one end surface which faces upward in FIG. 1 (corresponding to a first end surface of the present invention) 2 is referred to as an upper surface, and the other end surface (corresponding to a second end surface of the present invention) 3 is referred to as a lower surface. The terms "upper" and "lower" may be used in the descriptions below based on the relative positional relationship between the upper surface and the lower surface. However, it should be appreciated that such terms do not limit the orientations and positions of a cutting insert and that such terms are merely used to aid in easier understanding of the description and are not intended to limit the present invention. Further, parts having the same function are herein denoted by the same reference numerals, and when such parts are distinguished from one another for the purposes of description, an alphabetic letter or a numeral is added to the end of each of such reference numerals.

The cutting insert 1 is provided with a mounting hole 5 being a through hole which penetrates the upper surface 2 and the lower surface 3. Therefore, each of the upper surface 2 and the lower surface 3 is provided, at substantially a center part thereof, with a substantially circular-shaped opening of the mounting hole 5.

The peripheral side surface 4, which connects the upper and lower surfaces 2, 3, is given a positive clearance angle. In other words, the cutting insert 1 is a positive-type cutting insert, and more specifically (since, as described next, the upper surface 2 is of substantially rotational symmetry with respect to a central axis 5A of the mounting hole 5), when a first virtual plane (not shown) parallel to the central axis 5A of the mounting hole 5 is defined so as to pass through an edge of the upper surface, the peripheral side surface extends so as to be distant from this first virtual plane from the upper surface 2 toward the lower surface 3.

Figure 3:
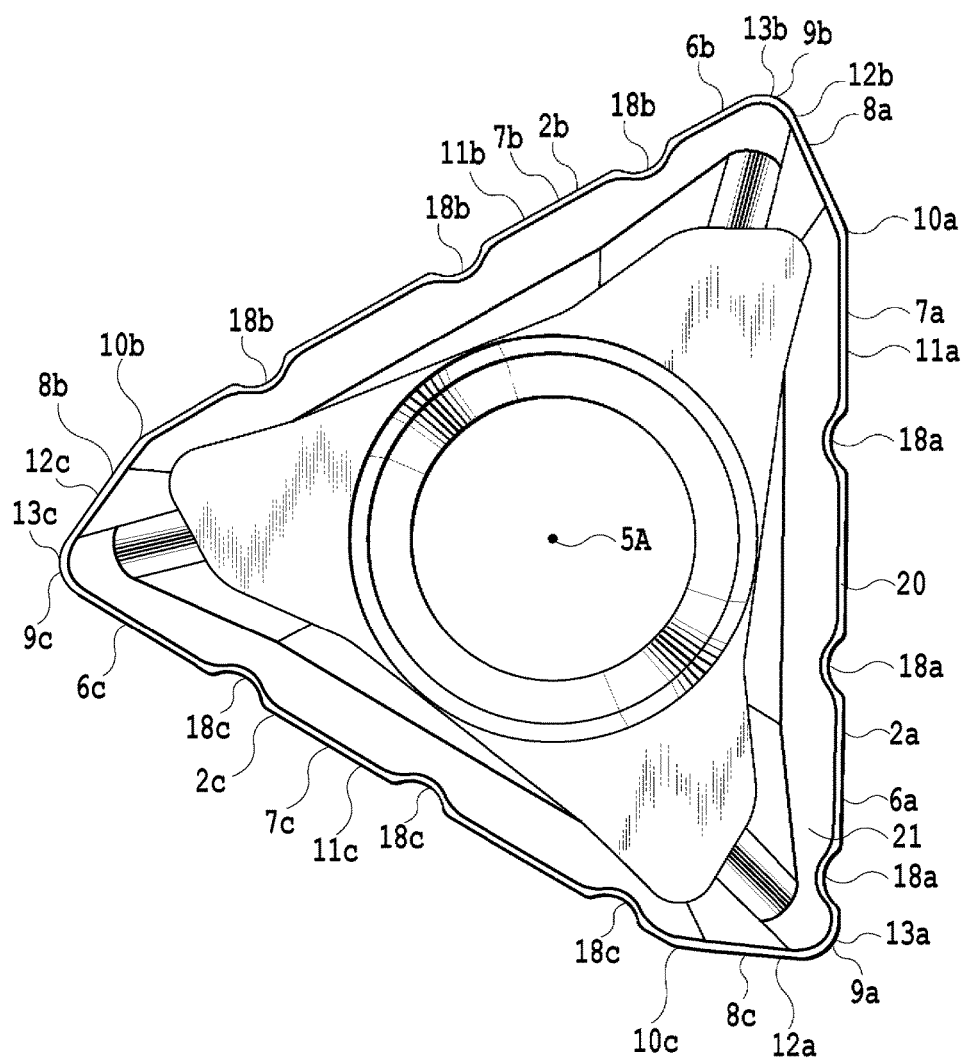
FIG. 3 is a top view of the cutting insert of FIG. 1.
Figure 4:
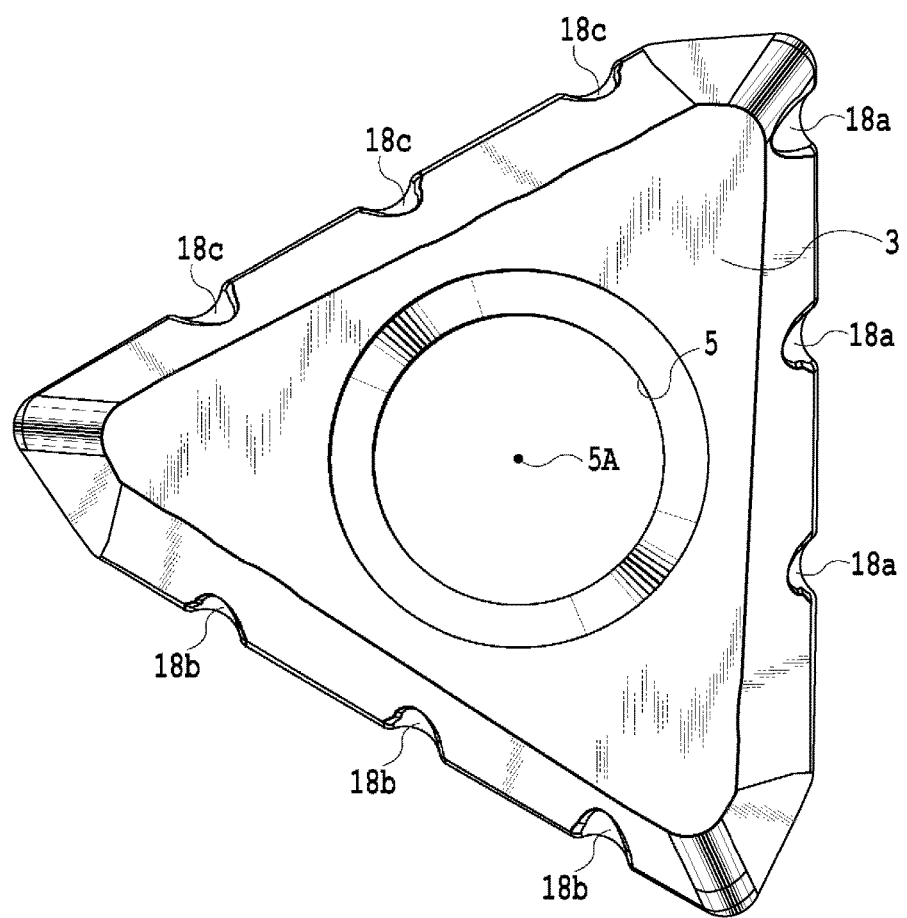
FIG. 4 is a bottom view of the cutting insert of FIG. 1.

As can be understood from FIG. 3, in a planar view of the cutting insert 1, i.e., when the cutting insert 1 is viewed from a side facing the upper surface 2, the upper surface 2 of the cutting insert 1 has a substantially triangular contour shape. The upper surface 2 takes a shape of substantially 120 degrees rotational symmetry with respect to the central axis 5A of the mounting hole 5. In other words, the upper surface 2 basically takes a shape of threefold rotational symmetry with respect to the central axis 5A of the mounting hole 5. Accordingly, the upper surface 2 mainly includes three sides 2a, 2b, 2c at an edge thereof. To be more precise, the contour shape of the upper surface 2 in the planar view is a substantially hexagonal shape. However, such contour shape is referred to as a substantially triangular shape since there is a large difference in length between the long side and the short side in each of the sides of the upper surface 2.

The substantially triangular-shaped upper surface 2 has a configuration in which the sides 2a, 2b, 2c of the substantially triangular shape are respectively divided into long sides 7a, 7b, 7c, each having a relatively long length, and short sides 8a, 8b, 8c, each having a relatively short length. Accordingly, the outer shape of the upper surface 2 is entirely a shape in which the three long sides 7a, 7b, 7c and the three short sides 8a, 8b, 8c are alternately connected with one another. The three long sides 7a, 7b, 7c have the same length, and the three short sides 8a, 8b, 8c also have the same length.

There are a total of six intersections, i.e., corners, between the long sides 7a, 7b, 7c and the short sides 8a, 8b, 8c. At each of three "raised" or first corners 9 (9a, 9b, 9c) out of the six corners, the relevant one of the long sides 7a, 7b, 7c and the relevant one of the short sides 8a, 8b, 8c, respectively, from adjacent sides, intersect so as to form an acute interior angle in FIG. 3. At each of the remaining three corners, i.e., "lowered" or second corners 10 (10a, 10b, 10c), the relevant one of the long sides 7a, 7b, 7c and the relevant one of the short sides 8a, 8b, 8c from a side intersect so as to form an obtuse interior angle in FIG. 3. The acute first corners 9 and the obtuse second corners 10 are alternately placed in a circumferential direction of the cutting insert. In FIG. 3, the three first corners 9 have the same interior angle, and the three second corners 10 also have the same interior angle. The angle of the first corner 9 is not particularly limited and may be a right angle or an obtuse angle. The first corner 9 is designed so as to be adapted for shoulder machining. In other words, the first corner 9 is configured so as to be adapted for substantially right-angle wall surface machining. The angle of the second corner 10 is also not particularly limited and may be adjusted as appropriate, depending on the angle of the first corner 9 and the number of sides of a substantially polygonal shape.

As described above, the upper surface has a substantially triangular shape, and therefore, three cutting edges (cutting edge parts) 6 (6a, 6b, 6c) are formed in an intersecting edge between the upper surface 2 and the peripheral side surface 4 (in other words, the cutting edges 6 extend along the intersecting edge). The cutting edges 6a, 6b, 6c are respectively associated with the corresponding first corners 9a, 9b, 9c.

Each cutting edge 6 can be divided into three cutting edge portions 11, 12, 13. More specifically, as shown in FIGS. 3 and 5 to 10, major cutting edges 11a, 11b, 11c are respectively formed in the three long sides 7a, 7b, 7c, minor cutting edges 12a, 12b, 12c are respectively formed in the three short sides 8a, 8b, 8c, and corner cutting edges 13a, 13b, 13c are respectively formed in the three first corners 9a, 9b, 9c. The first cutting edge 6a is formed such that the corner cutting edge 13a, and the major cutting edge 11a and the minor cutting edge 12a which are located on the sides thereof, are associated with one another and function as one cutting edge set. Similarly, in the second cutting edge 6b, the major cutting edge 11b, the minor cutting edge 12b and the corner cutting edge 13b are associated with one another and function as one set, and in the third cutting edge 6c, the major cutting edge 11c, the minor cutting edge 12c and the corner cutting edge 13c are associated with one another and function as one set. The three sets of the cutting edges 6 are arranged at rotationally symmetrical positions around the central axis 5A of the mounting hole 5.

The cutting edges 6 of the cutting insert 1 and their peripheries may be made of hard materials, such as a cemented carbide, cermet, ceramic, an ultrahigh-pressure sintered body containing diamond or cubic boron nitride, or a material obtained by applying a coating to these materials.

In FIG. 3, the corner cutting edges 13a, 13b, 13c are each curved at a constant curvature radius (corner radius) and can be involved in the cutting of a corner where a side wall surface and a bottom wall surface of a workpiece (not shown) intersect with each other. It should be noted that the major cutting edges 11a, 11b, 11c can be involved in the cutting of a side wall surface of the workpiece. Although, in the cutting insert 1 of the present embodiment, the long sides 7a, 7b, 7c entirely function as major cutting edges, the configuration is not limited thereto, and it is also possible to employ an embodiment in which part of a long side serves as a major cutting edge. In the cutting insert 1, the major cutting edges 11a, 11b, 11c are each formed in a recessed curved shape which, in terms of its entire shape, slightly bulges outward in the planar view of the cutting insert 1 (FIG. 3). The minor cutting edges 12a, 12b, 12c can be involved in the cutting of a bottom wall surface (or a machined surface) of the workpiece. The minor cutting edges 12a, 12b, 12c can also be involved in, for example, cutting in which the workpiece is subjected to pocketing in the vertical direction. It should be noted that a minor cutting edge may be served by a short side in its entirety or may also be served by part thereof. As described above, the cutting insert 1 of the present embodiment includes, in the upper surface 2, three cutting edge sets, each of which is constituted by three types of cutting edge portions, and such cutting edges can be used in turn. In short, the cutting insert 1 is an indexable cutting insert.

Figure 5:
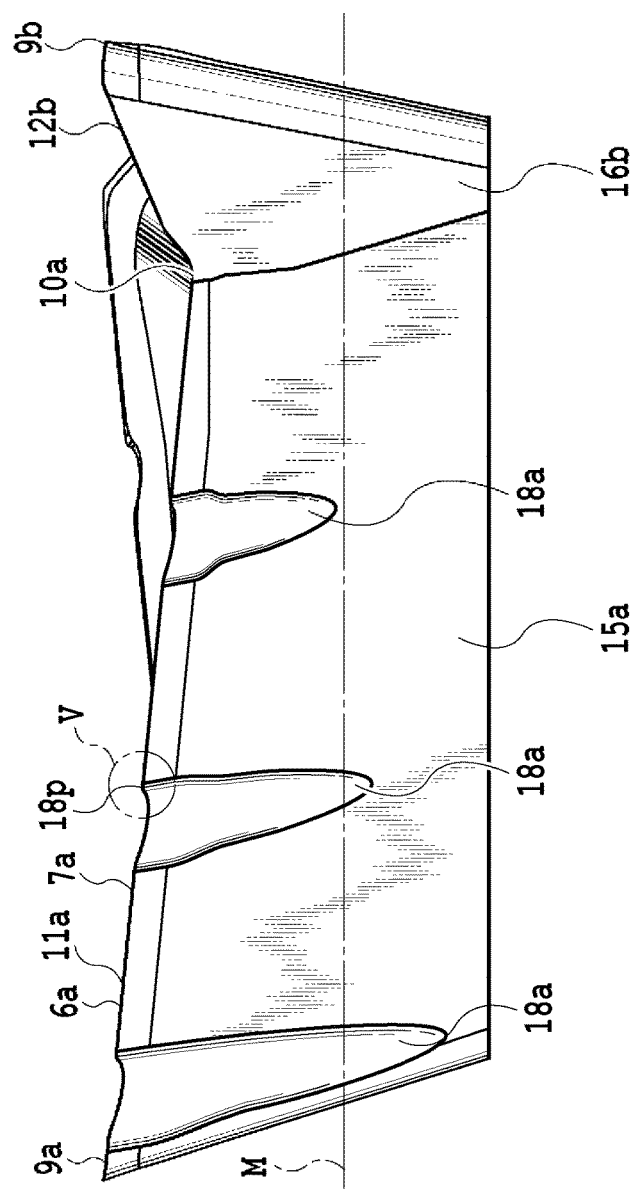
FIG. 5 is a side view of the cutting insert of FIG. 1.
Figure 6:
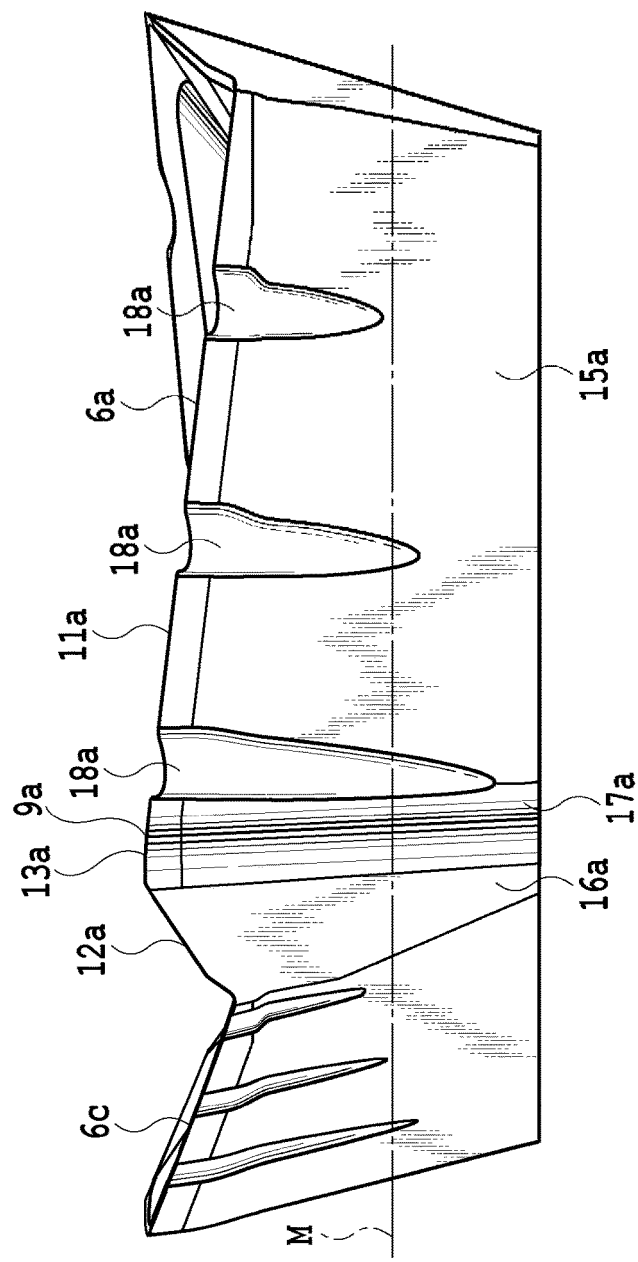
FIG. 6 is a side view of the cutting insert of FIG. 1 which is viewed from a direction facing one corner side surface.
Figure 7:
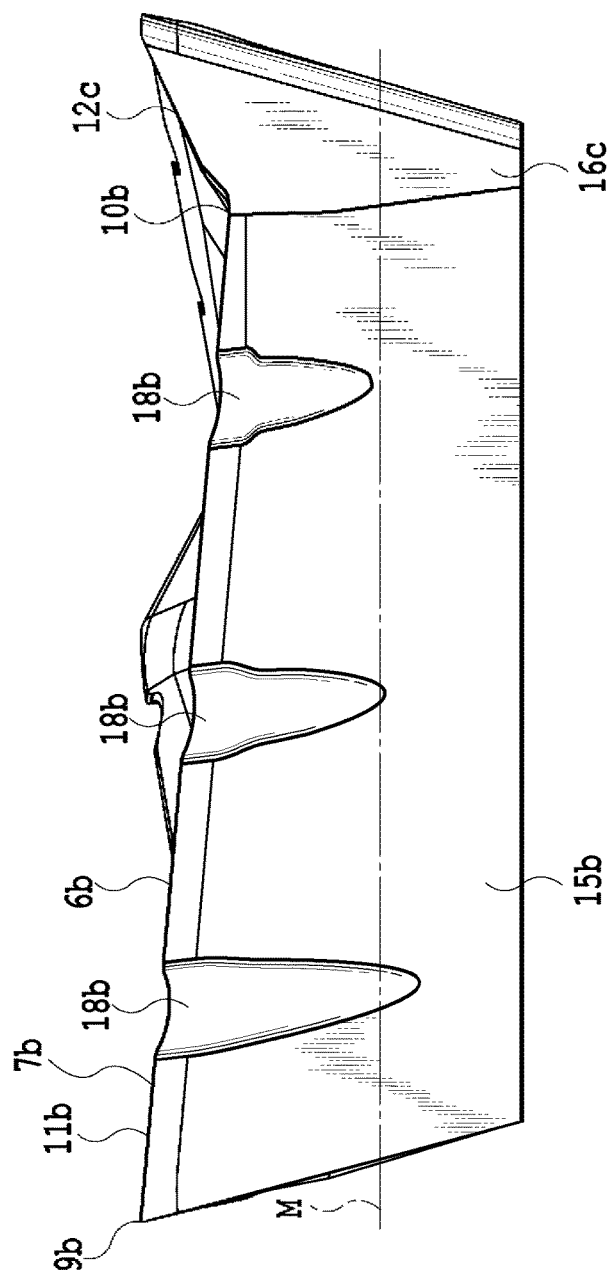
FIG. 7 is a side view of the cutting insert of FIG. 1 which is viewed from a different direction from that of FIG. 5.
Figure 8:
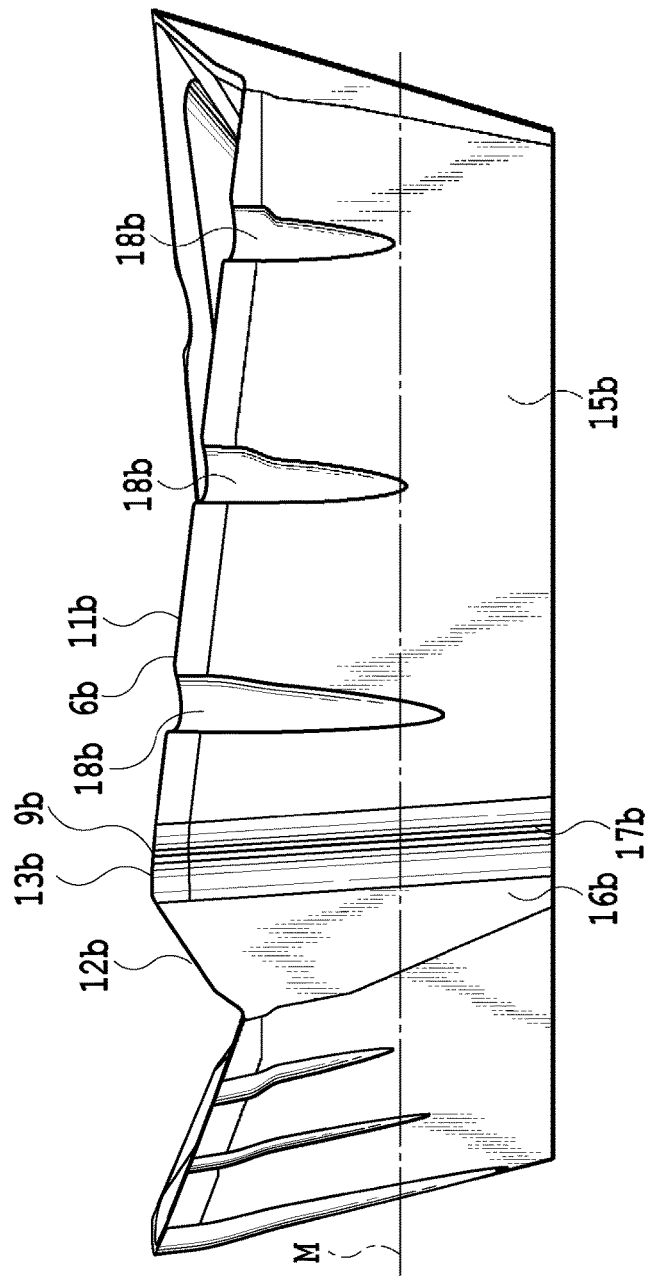
FIG. 8 is a side view of the cutting insert of FIG. 1 which is viewed from a direction facing a different corner side surface from the corner side surface of FIG. 6.
Figure 9:
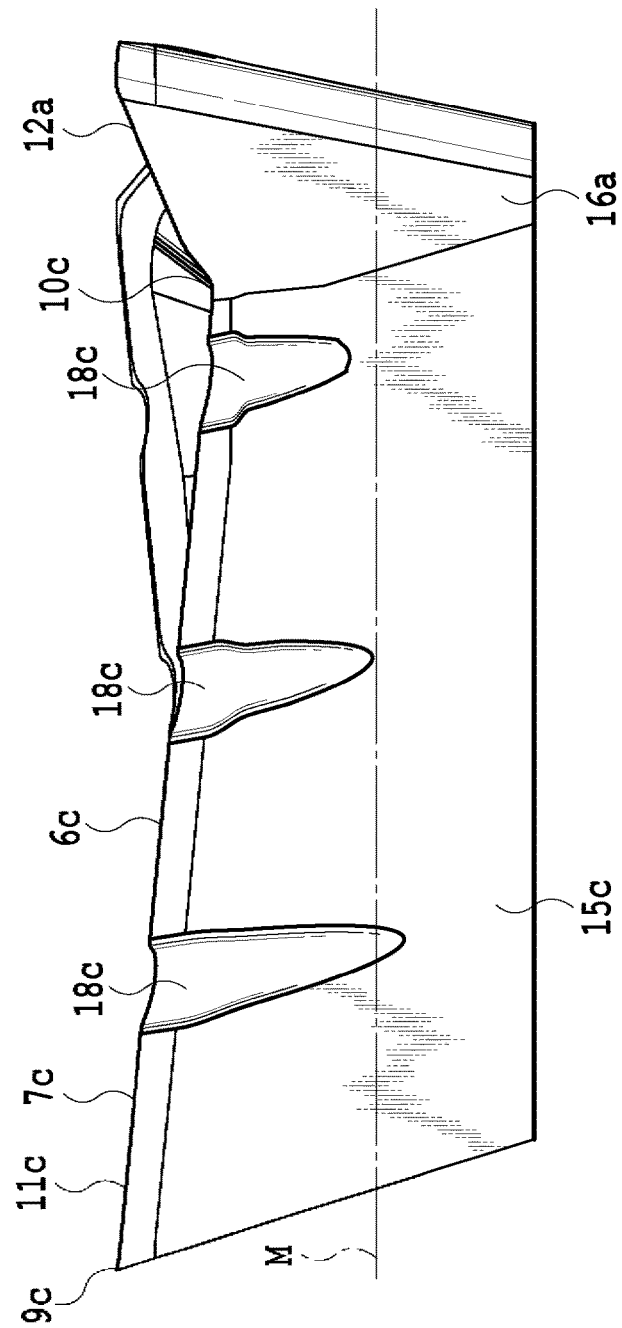
FIG. 9 is a side view of the cutting insert of FIG. 1 which is viewed from a different direction from those of each of FIGS. 5 and 7.
Figure 10:
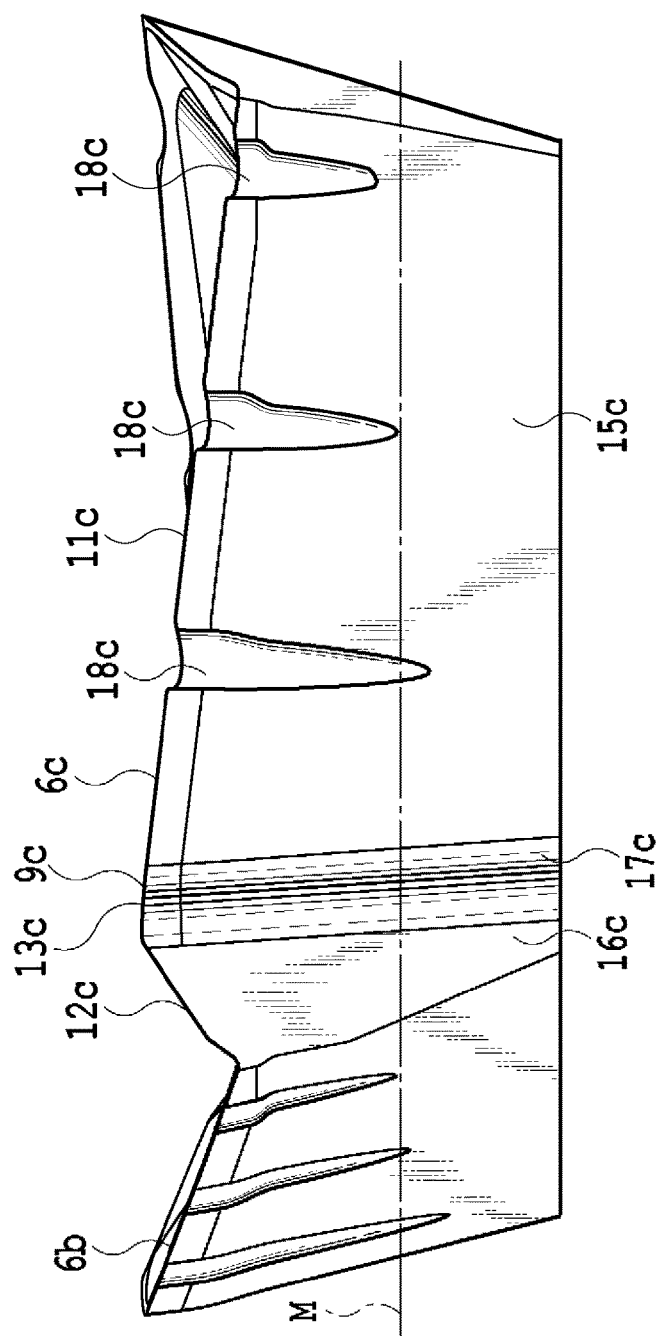
FIG. 10 is a side view of the cutting insert of FIG. 1 which is viewed from a direction facing a different corner side surface from each of the corner side surfaces of FIGS. 6 and 8.

Herein, a plane which is orthogonal to the central axis 5A of the mounting hole 5 and which extends between the upper surface 2 and the lower surface 3 of the cutting insert 1 is defined as a middle plane M. As shown in FIGS. 5 and 6, the major cutting edge 11a is formed such that the length between the major cutting edge 11a and the middle plane M gradually becomes shorter as a portion of the major cutting edge 11a becomes more distant from the associated corner cutting edge 13a (i.e., the first corner 9a) which forms the first cutting edge 6 together with the major cutting edge 11a. Further, at a portion where the length between the major cutting edge 11a and the middle plane M is the shortest (i.e., the part closest to the middle plane M), the major cutting edge 11a is connected with the minor cutting edge 12b which belongs to the adjacent second cutting edge 6b. Such connecting portion also serves as the above-described second corner 10a. As shown in FIGS. 7 and 8, as with the case of the major cutting edge 11a, the major cutting edge 11b of the second cutting edge 6b is also formed such that the length between the major cutting edge 11b and the middle plane M gradually becomes shorter as a portion of the major cutting edge 11b becomes more distant from the associated corner cutting edge 13b. As shown in FIGS. 9 and 10, as with the case of the major cutting edge 11a, the major cutting edge 11c of the third cutting edge 6c is also formed such that the length between the major cutting edge 11c and the middle plane M gradually becomes shorter as the major cutting edge 11c becomes more distant from the associated corner cutting edge 13c. As described above, in the cutting insert 1 of the present embodiment, the major cutting edges 11a, 11b, 11c are inclined such that respective portions thereof are closer to the middle plane M as they are respectively more distant from the adjacent associated corner cutting edges 13a, 13b, 13c and such that respective portions thereof which are located at the second corners 10a, 10b, 10c are closest to the middle plane M. Accordingly, the major cutting edges correspond to inclined cutting edge portions. It should be noted that the major cutting edges 11a, 11b, 11c may be in a linear shape rather than being in a curved shape. Further, the inclination of each of the major cutting edges 11a, 11b, 11c relative to the middle plane M may have a constant angle, but it is also possible to employ an embodiment in which such angle varies at a midpoint of a cutting edge.

Similarly, the minor cutting edges are inclined such that respective portions thereof are closer to the middle plane M as they are respectively more distant from the adjacent corner cutting edges (i.e., the adjacent first corners). The minor cutting edges 12a, 12b, 12c may also be either in a linear shape or in a curved shape.

The peripheral side surface 4 is configured as comprising a plurality of side surfaces (side surface parts) 15, 16, 17. Specifically, the peripheral side surface 4 comprises major side surfaces 15a, 15b, 15c which are respectively adjacent to the major cutting edges 11a, 11b, 11c, minor side surfaces 16a, 16b, 16c which are respectively adjacent to the minor cutting edges 12a, 12b, 12c, first corner side surfaces 17a, 17b, 17c which are respectively adjacent to the corner cutting edges 13a, 13b, 13c (i.e., first corners), and second corner side surfaces which are respectively adjacent to the second corners. The above three major side surfaces, three first corner side surfaces, three minor side surfaces and three second corner side surfaces are continuous in the circumferential direction. It should be noted that, in the cutting insert, since each of the second corner side surfaces has a very narrow circumferential width, the adjacent major side surface and minor side surface may be regarded as being directly connected to each other.

When the cutting insert 1 is mounted on a tool body 101 such that one cutting edge 6 from among the three cutting edges 6 serves as an active cutting edge, the upper surface 2 can function as a rake surface, and the associated major side surface, minor side surface and first corner side surface which correspond to such active cutting edge can function as flanks. The lower surface 3 can function as a seating surface which comes into contact with a bottom wall surface of an insert mounting seat of the tool body.

Each major side surface 15 is provided with nicks 18. More specifically, the three major side surfaces 15a, 15b, 15c are respectively provided with grooves (hereinafter, such grooves are referred to as "nicks") 18a, 18b, 18c in units of three nicks each. For example, the major side surface 15a which extends along the major cutting edge 11a is provided with the three nicks 18a. The nicks 18a, 18b, 18c extend in a thickness direction of the cutting insert 1 (insert thickness direction as a direction connecting the upper and lower surfaces), and one end of each of such nicks reaches the upper surface 2 and is opened in the upper surface 2. In other words, the nicks 18a, 18b, 18c are each formed so as to remove part of the side of the upper surface 2 and respectively form openings 18o in the upper surface 2. Therefore, the major cutting edges 11a, 11b, 11c are respectively divided (separated) by the nicks 18a, 18b, 18c into a plurality of portions. In the cutting insert 1, all of the nicks are designed such that the openings 18o have substantially the same shape and substantially the same size. However, at least one of the shape and the size of the openings may vary among the nicks.

The nicks 18a, 18b, 18c are each formed in a so-called tapered shape such that a width thereof gradually becomes narrower toward the lower surface 3. As shown in FIG. 5, when the cutting insert 1 is seen from a side view from the major side surface 15a side, the three nicks 18a are all formed so as to be inclined with respect to the thickness direction of the cutting insert 1, i.e., herein, a perpendicular direction, relative to the lower surface 3, which is substantially parallel to the central axis 5A of the mounting hole 5, and such nicks 18a involve the same inclination direction. It should be noted that, in the cutting insert 1, when such cutting insert is mounted on the tool body described below, such nick inclination direction is designed such that the nicks for the major cutting edge of an active cutting edge substantially extend along a second virtual plane (not shown) orthogonal to a rotational axis of the tool body. The same applies to the nicks 18b of the major side surface 15b and also to the nicks 18c of the major side surface 15c. It should also be noted that the three nicks in a major side surface are formed such that a nick which is closer to the corner cutting edge has a greater length. However, the nicks may extend substantially parallel to the central axis 5A of the mounting hole 5, and the nicks in the same side surface may extend so as to reach the lower surface 3 and may have the same length.

Figure 11:
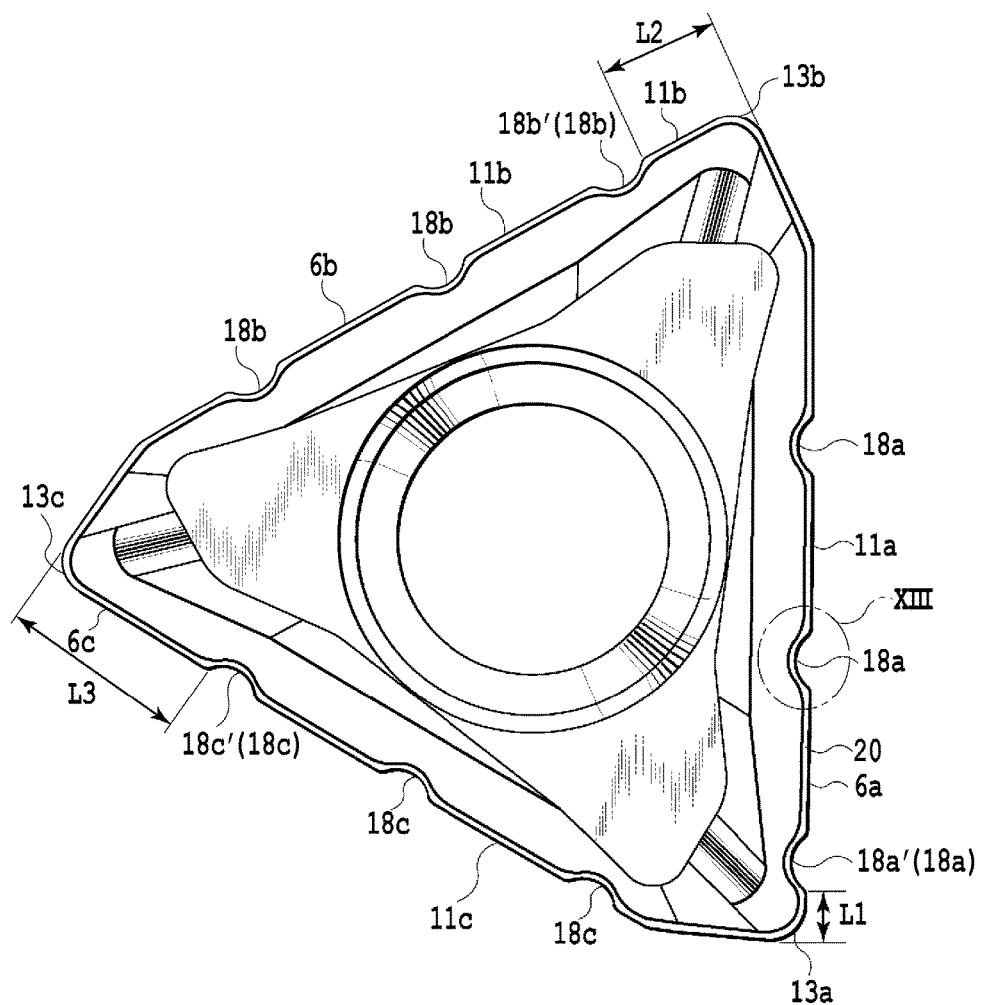
FIG. 11 is an explanatory view corresponding to FIG. 3 and explaining positional relationships between nicks.

The positions of the nicks 18a, 18b, 18c formed in the major side surfaces 15a, 15b, 15c vary among the major side surfaces. Specifically, the intervals between the three nicks formed in one major side surface are the same among the major side surfaces 15a, 15b, 15c, but the distances from the corner cutting edge 13 to the nick located closest to such corner cutting edge 13 vary among the major side surfaces. Accordingly, when, in the planar view from the upper surface 2 side of FIG. 11, the length from the corner cutting edge 13a to an end, on the corner cutting edge 13a side, of a nick 18a' which is closest to the corner cutting edge 13a is defined as "L1," the length from the corner cutting edge 13b to an end, on the corner cutting edge 13b side, of a nick 18b' which is closest to the corner cutting edge 13b is defined as "L2," and the length from the corner cutting edge 13c to an end, on the corner cutting edge 13c side, of a nick 18c' which is closest to the corner cutting edge 13c is defined as "L3," the relationship of L1 <L2 <L3 holds true. It should be noted that these three nicks 18a', 18b', 18c' are formed such that the distances of such nicks with respect to the relevant corner cutting edges 13 are those which involve a gradual increase in the order of the nick 18a', the nick 18b' and the nick 18c'. Accordingly, the grooves 18a in the cutting edge 6a, the grooves 18b in the cutting edge 6b and the grooves 18c in the cutting edge 6c are asymmetrical around the axis 5A which extends in the insert thickness direction defined so as to intersect with both of the upper and lower surfaces. Thus, even though the upper surface 2 takes a shape of n-fold rotational symmetry and the insert is indexable about the central axis 5A, the upper surface 2 is rotationally asymmetric about the central axis 5A. It should be noted that the nicks 18a, 18b, 18c of the present embodiment are provided, in the respective major side surfaces, in units of three nicks each, having the above-described shape. However, the shape and number are not limited thereto. Another embodiment may involve a different number of nicks in a different shape from those of the nicks 18a, 18b, 18c of the present embodiment.

Figure 12:
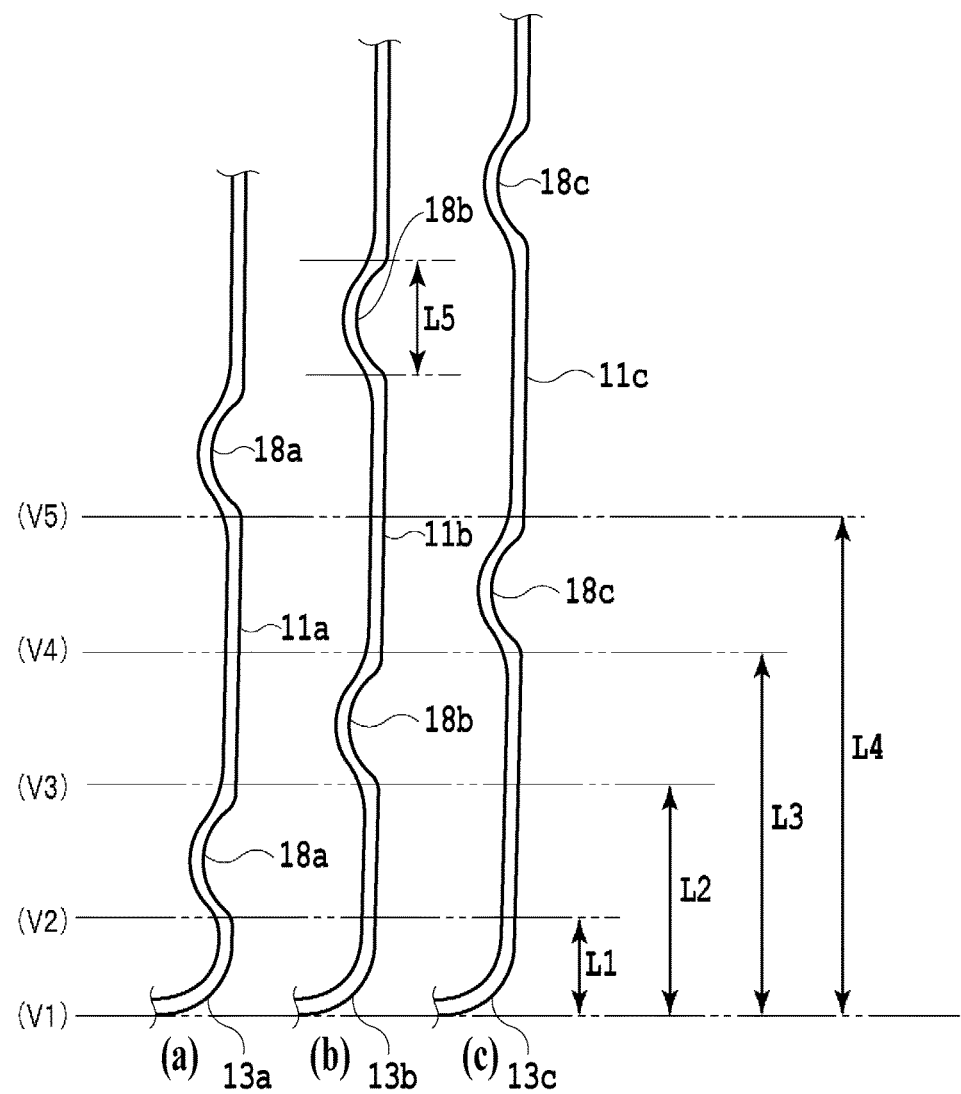
FIG. 12 is an explanatory view explaining positional relationships of nicks relative to each of the cutting edges.

The arrangement of the nicks in each cutting edge 6 will be described below using FIG. 12. In FIG. 12, (a) refers to a figure of an excerpt from FIG. 3 which shows a portion, on the corner cutting edge 13a side, of the major cutting edge 11a of the first cutting edge 6a, (b) refers to a figure of an excerpt from FIG. 3 which shows a portion, on the corner cutting edge 13b side, of the major cutting edge 11b of the second cutting edge 6b, and (c) refers to a figure of an excerpt from FIG. 3 which shows a portion, on the corner cutting edge 13c side, of the major cutting edge 11c of the third cutting edge 6c. In FIG. 12, these figures (a) to (c) are placed such that the corner cutting edges are located on a virtual line V1.

In FIG. 12, a virtual line V2 is a line passing through an end, on the corner cutting edge 13a side, of the nick 18a closest to the corner cutting edge 13a, and the virtual line V2 is parallel to the virtual line V1 and is separate from the virtual line V1 by the length L1. In FIG. 12, a virtual line V3 is a line passing through an end, on the corner cutting edge 13b side, of the nick 18b closest to the corner cutting edge 13b, and the virtual line V3 is parallel to the virtual line V1 and is separate from the virtual line V1 by the length L2. In FIG. 12, a virtual line V4 is a line passing through an end, on the corner cutting edge 13c side, of the nick 18c closest to the corner cutting edge 13c, and the virtual line V4 is parallel to the virtual line V1 and is separate from the virtual line V1 by a length L3. Further, in FIG. 12, with regard to the first cutting edge 6a, a virtual line V5 is a line passing through an end, on the corner cutting edge 13c side, of the nick 18a second closest to the corner cutting edge 13c, and the virtual line V5 is parallel to the virtual line V1 and is separate from the virtual line V1 by a length L4.

As can be understood from FIG. 12, the nicks of the three major cutting edges 11a, 11b, 11c are not equidistant from the corresponding corner cutting edges, and when such cutting edges are arranged relative to the line V1, the nicks do not overlap one another. Therefore, the difference between the length L4, between the line V1 and the line V5, and the length L1 (corresponding to "L1" in FIG. 11), between the line V1 and the line V2, (=L4−L1) is greater than triple the width L5 (=K5×3) of each nick in FIG. 12. Therefore, as described below, when using a cutting tool which is provided with a plurality of cutting inserts 1 such that a plurality of insert mounting seats of a tool body involve different cutting edges to be used, a portion of a workpiece which remains uncut by the nicks 18a through cutting by the major cutting edge 11a can be cut through cutting by either of the major cutting edges 11b, 11c. It should be noted that, as shown in FIGS. 15 to 18, while each cutting insert 1 is mounted on the tool body in an inclined manner so as to give an active cutting edge a predetermined positive rake angle, during the use in such state, the nick positions of different cutting edges are related to one another.

As shown in FIGS. 1, 3, 11 and 12, a land 20 is formed throughout the periphery of the upper surface 2 and along the contour shape of the upper surface 2. In other words, the land 20 is formed in the upper surface 2 along the major cutting edges 11a, 11b, 11c, the minor cutting edges 12a, 12b, 12c and the corner cutting edges 13a, 13b, 13c. The land 20 is formed also along the shape of the openings 18o of the nicks 18a, 18b, 18c. The land 20 is a surface (part of a rake surface) which is given a positive rake angle and is a so-called positive land. Accordingly, when defining a third virtual plane (not shown) which is orthogonal to the central axis 5A of the mounting hole 5 and which extends substantially along the cutting edges, the land 20 extends so as to be more distant from this third virtual plane as it becomes more distant from the cutting edges toward the mounting hole 5.

Further, an inclined surface 21, being a rake surface, is formed inside the land 20 (i.e., between the land 20 and the mounting hole 5). The inclined surface 21 is formed so as to be adjacent to the land 20 and is inclined so as to be in the same direction as that of the land 20, i.e., so as to form a positive rake angle. An inclination angle of the inclined surface 21 with respect to the third virtual plane is greater than that of the land 20.

Herein, when viewed from a direction facing the upper surface 2, the distance from a side (i.e., a cutting edge) of the upper surface 2 to an intersecting edge between the land 20 and the inclined surface 21 is defined as the "land width." In other words, the land 20 width can be defined as the width in a top view, i.e., FIG. 3. The land width in a direction perpendicular to a tangent drawn at a portion of a cutting edge in FIG. 3 can be treated as being the definition of the land width at such portion of the cutting edge. In short, the land width is the length in a direction orthogonal to a cutting edge when viewed from the direction facing the upper surface 2, i.e., in FIG. 3.

Figure 13:
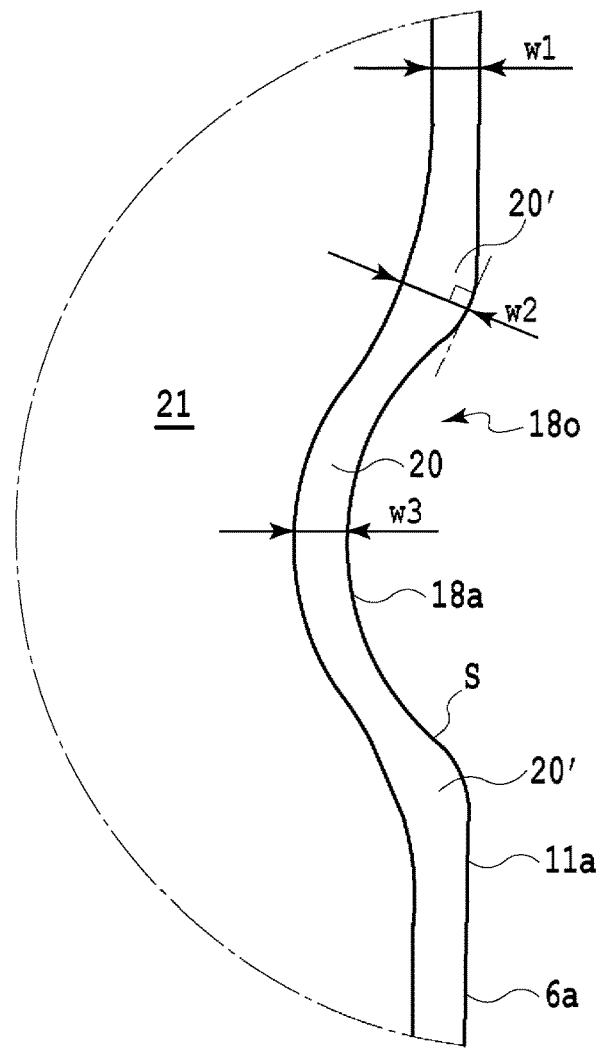
FIG. 13 is an enlarged schematic view showing an XIII area of FIG. 11 in an enlarged manner.

In the cutting insert 1, a first width w1 is set as a basic width of the land 20. Herein, intersecting areas of the nicks 18a, 18b, 18c with respect to the upper surface 2, in particular, areas including connecting portions between the nicks and the major cutting edges 11a, 11b, 11c, are referred to as "end areas," which are denoted by reference symbol "S." Thus, each nick is bordered by two such end areas S. At this time, the land width is not constant throughout the periphery of the upper surface 2, a portion of the land which is located in the end area S (in particular, a portion thereof adjacent to the end area) has a greater width than that of a portion of the land which is distant from a nick. Specifically, as shown in the enlarged view of FIG. 13, a portion of the land which is formed so as to be adjacent to the end area S of the nick 18a has a greater width than that of a portion of the land which is formed so as to be adjacent to a portion of the major cutting edge 11a which is distant from the end area S. In particular, a portion 20' of the land which is adjacent to each of the ends of the opening 18o of the nick has a width w2 as the maximum width (w2>w1). Thus, the land 20 has a varying land width, and the land width w2 at an end area S is greater than the land width w1 at distant locations on an adjacent portion of an associated major cutting edge 11a. Further, in the cutting insert 1, the end area not only includes such end of the opening of the nick but also extends over the connecting portion between the nick and the upper surface. Moreover, any portion of the land which is located around the opening of the nick has a greater width than the width w1 of a portion of the land which is distant from the end area S ((w2>)w3>w1). Thus, for a given nick 18a, land widths w2 at the two end areas S bordering that nick are greater than land widths w3 at locations between those two end areas S. Such variation in the land width holds true for each of the three nicks 18a. With regard to the second cutting edge 6b as well, a portion of the land which is adjacent to an end area of the nick 18b similarly has a greater width than that of the other portion thereof. With regard to the third cutting edge 6c as well, a portion of the land which is adjacent to an end area of the nick 18c similarly has a greater width than that of the other portion thereof. It should be noted that the range recognized as being an "end area of the nick 18a, 18b, 18c," which involves a relatively greater land width, is not particularly limited. However, such range may encompass an end in which a nick intersects with a major cutting edge and may particularly encompass an end 18p (see FIG. 5) of the opening 18o which forms an acute angle with the major cutting edge in the side view of the cutting insert. Excessively extending the range of a nick's end area toward the cutting edge side means that a wide portion of the land is formed in a wide range, and therefore, this may lower the cutting ability of the major cutting edges 11a, 11b, 11c. Accordingly, a nick's end area is preferably formed in a size which does not lower the cutting ability of the major cutting edges 11a, 11b, 11c. In the cutting insert 1, the first width w1, which is a width of a portion of the land 20 which is located distant from the nick 18a, can be set at approximately 0.15 mm. Meanwhile, the width of a portion 20' of the land 20 which is located at a corner, in an end area of the nick 18a in FIG. 13, where the major cutting edge 11a is connected with the nick 18a (a portion of each of the ends of the opening) (the land 20' width) is the second width w2. This second width w2 is greater than the first width w1 and can be set at 0.25 mm.

Next, an indexable cutting tool comprising cutting inserts 1 will be described. As shown in FIGS. 14 to 18, an indexable cutting tool 100 is a roughening end mill in which a plurality of cutting inserts 1 is mounted on the tool body 101 along a circumferential direction thereof and a rotational axis direction of the tool. The tool body has a substantially cylindrical shape and an axis 101A extending from a leading end side to a base end side.

Figure 14:
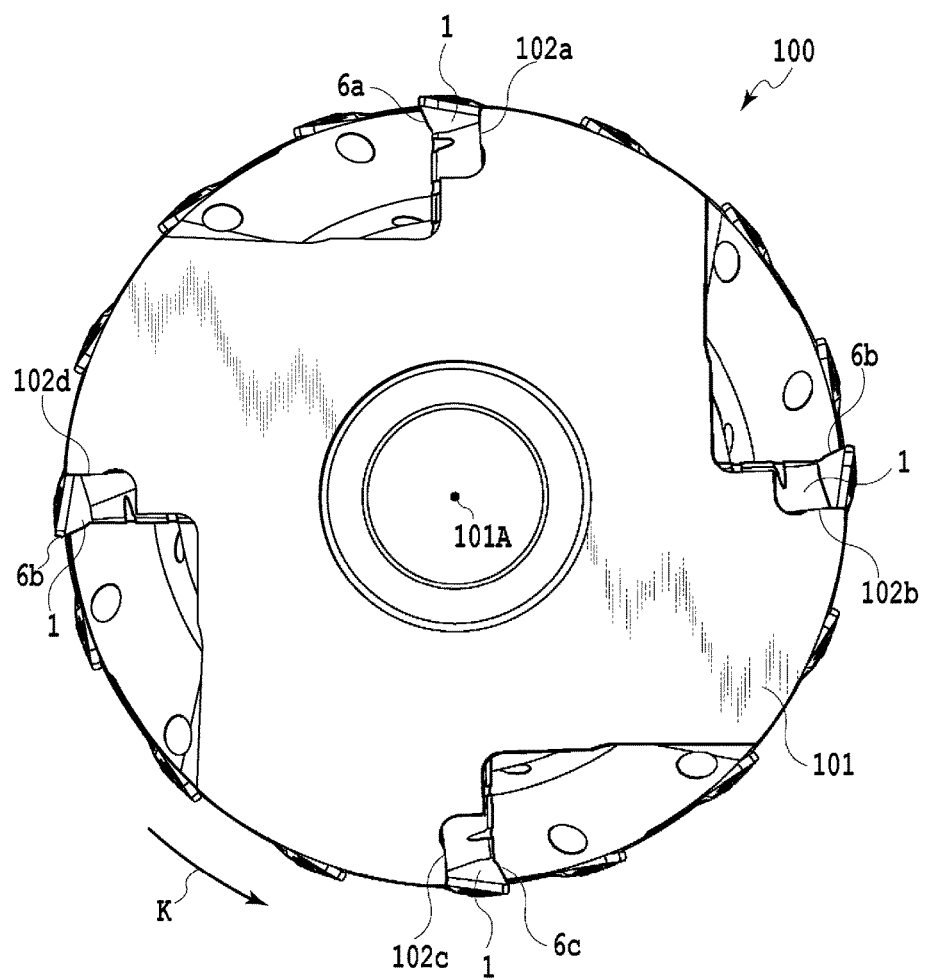
FIG. 14 is a view showing a leading end of a cutting tool according to an embodiment of the present invention.

Four insert mounting seats 102, on which cutting inserts 1 are mounted, are arranged in the circumferential direction, as shown in FIG. 14, in which the indexable cutting tool 100 is viewed from a leading end thereof. In other words, the insert mounting seats 102 are arranged on the tool body 101 in four sections. For the purposes of description below, such insert mounting seats, in four sections, placed in the circumferential direction are distinguished from one another with different reference symbols by defining an insert mounting seat in one section as an insert mounting seat 102a and by, based on such definition, designating the respective insert mounting seats as the insert mounting seat 102*a*, an insert mounting seat 102*b*, an insert mounting seat 102*c* and an insert mounting seat 102*d*, in order toward the back side with respect to a tool rotating direction K. The cutting insert 1 is mounted on the insert mounting seat 102*a* such that the first cutting edge 6*a*, which comprises the major cutting edge 11*a*, the minor cutting edge 12*a* and the corner cutting edge 13*a*, serves as an active cutting edge. The cutting insert 1 is mounted on the insert mounting seat 102*b* such that the second cutting edge 6*b*, which comprises the major cutting edge 11*b*, the minor cutting edge 12*b* and the corner cutting edge 13*b*, serves as an active cutting edge. The cutting insert 1 is mounted on the insert mounting seat 102*c* such that the third cutting edge 6*c*, which comprises the major cutting edge 11*c*, the minor cutting edge 12*c* and the corner cutting edge 13*c*, serves as an active cutting edge. The cutting insert 1 is mounted on the insert mounting seat 102*d* such that the second cutting edge 6*b*, which comprises the major cutting edge 11*b*, the minor cutting edge 12*b* and the corner cutting edge 13*b*, serves as an active cutting edge. As described above, the mounting of the cutting inserts 1 is performed such that the major cutting edges 11*a*, 11*b*, 11*c*, which involve different positions where nicks are formed, serve as adjacent active cutting edges in the circumferential direction, whereby, for example, a portion which remains uncut by the nick 18*a* of the major cutting edge 11*a* of the first cutting edge 6*a* can be cut by the major cutting edge 11*b* of the second cutting edge 6*b* or the major cutting edge 11*c* of the third cutting edge 6*c*. Similarly, a portion which remains uncut by the nick 18*b* or the nick 18*c* can be cut by a different major cutting edge. In other words, as viewed from a direction perpendicular to the rotational axis, rotational trajectories of the cutting edges, each of which is separated by the nicks, partially overlap one another, and a combined trajectory obtained by combining the rotational trajectories of the three types of major cutting edges passes outside the rotational trajectories of all the nicks, i.e., passes through the outermost parts of all the grooves of each cutting insert or extends outside such grooves. It should be noted that the "outside of the rotational trajectories" does not refer to a distant position in a direction along the rotational axis (i.e., the axis 101A) but instead refers to a distant position in a radial direction around the rotational axis. This causes uncut portions to be less likely to be formed in a machined surface.

Figure 15:
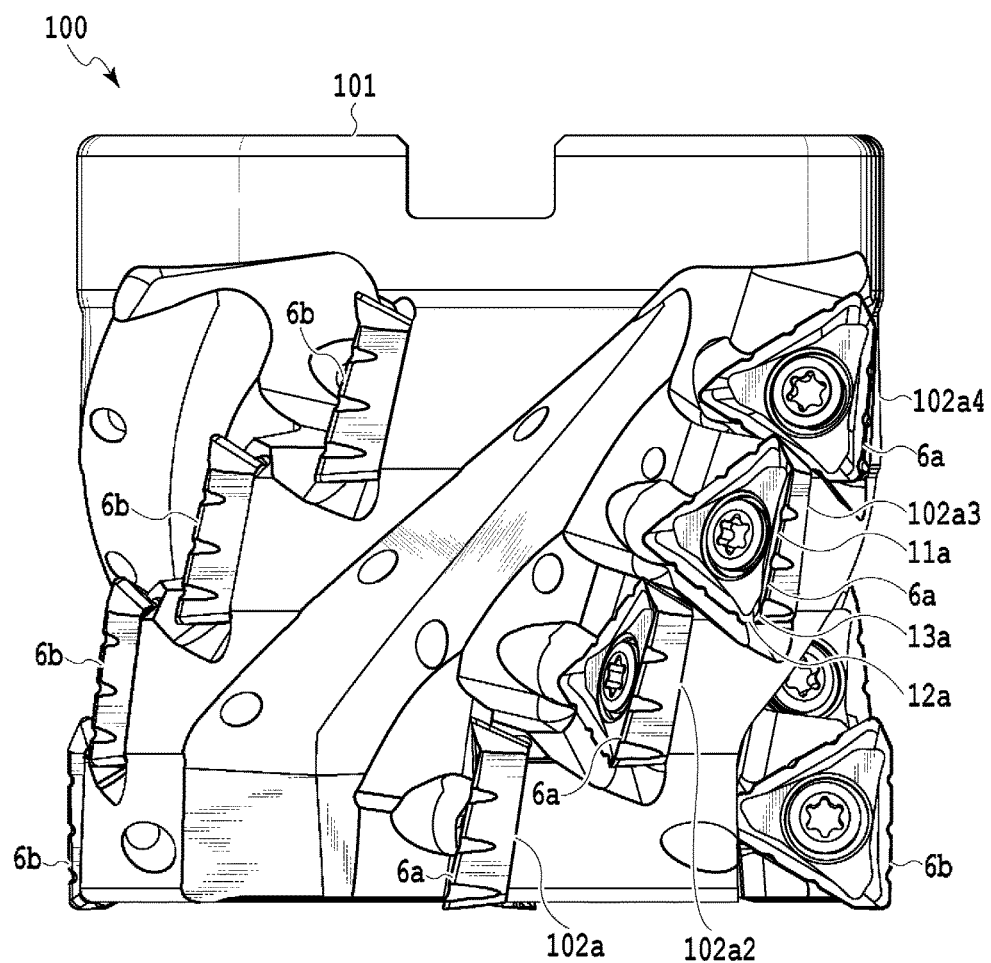
FIG. 15 is a side view of the cutting tool of FIG. 14.

As shown in FIG. 15, three insert mounting seats 102*a*2, 102*a*3, 102*a*4 are further formed above the insert 102*a* located closest to the leading end side, i.e., formed on the base end side of the tool body 101. In other words, insert mounting seats, each involving the first cutting edge 6*a* as an active working edge, are formed in four segments. In the present embodiment, the insert mounting seats 102 are formed such that, when the insert mounting seat closest to the leading end of the tool body 101 is regarded as a positional reference, an insert mounting seat 102 located closer to the base end of the tool body 101 is formed further backward with respect to the rotating direction K of the indexable cutting tool 100. In other words, the insert mounting seat 102*a*2 is located further backward with respect to the tool rotating direction than the insert mounting seat 102*a* located closest to the leading end, the insert mounting seat 102*a*3 is located further backward with respect to the rotating direction than the insert mounting seat 102*a*2, and the insert mounting seat 102*a*4 is located further backward with respect to the rotating direction than the insert mounting seat 102*a*3. The cutting insert 1 is mounted on each of the insert mounting seats 102*a*2, 102*a*3, 102*a*4 such that the cutting edge 6*a* serves as an active cutting edge, as with the case of the insert mounting seat 102*a*.

Figure 16:
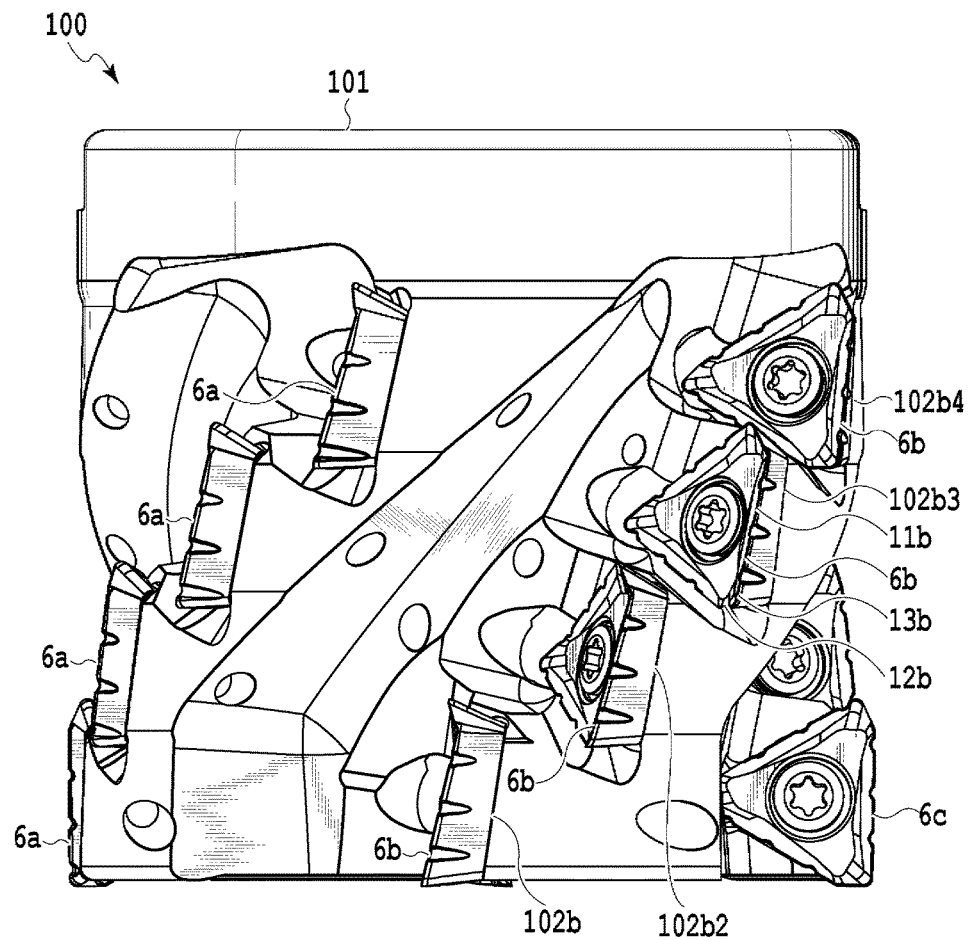
FIG. 16 is a side view of the cutting tool of FIG. 14 which is viewed from a different direction from that of FIG. 15.
Figure 17:
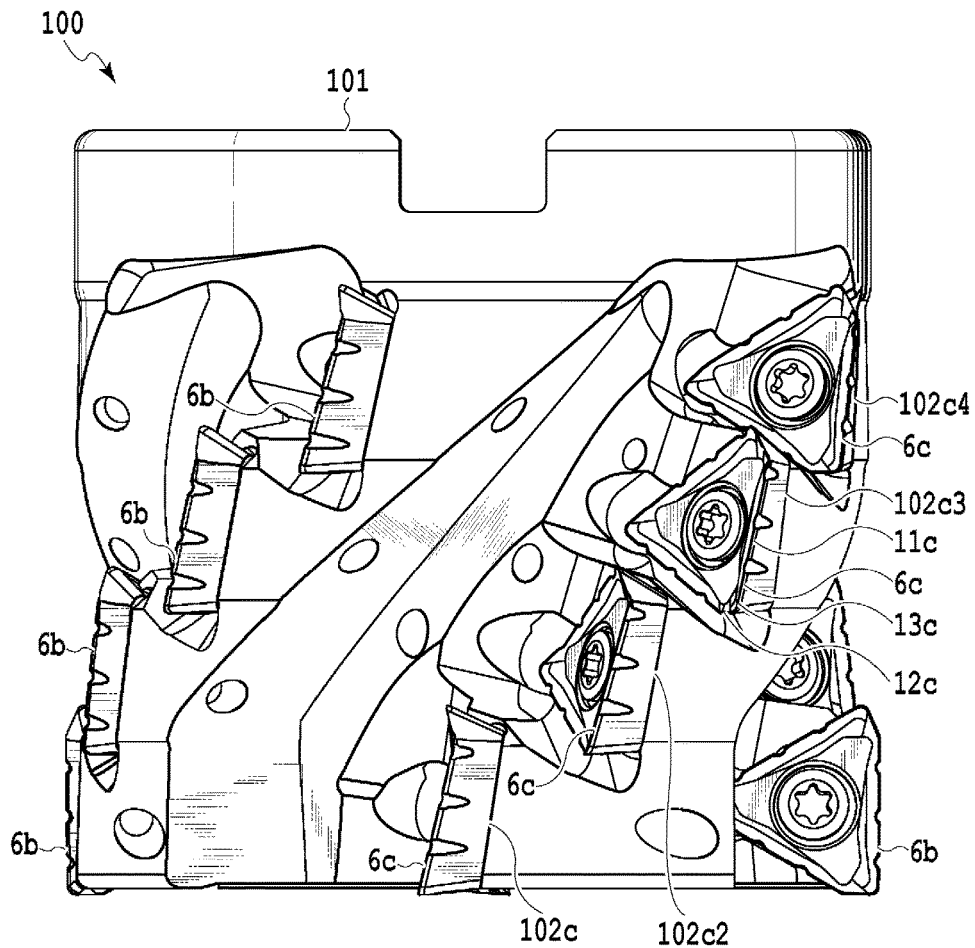
FIG. 17 is a side view of the cutting tool of FIG. 14 which is viewed from a different direction from those of each of FIGS. 15 and 16.
Figure 18:
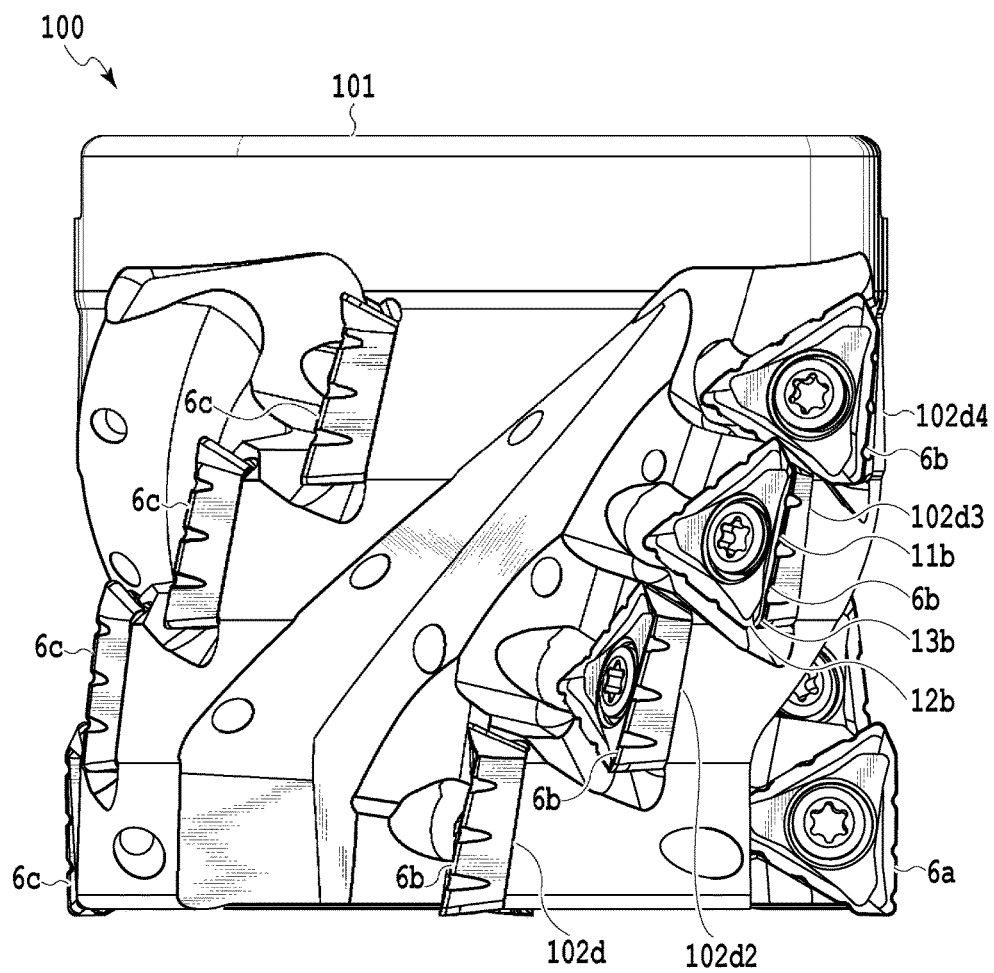
FIG. 18 is a side view of the cutting insert of FIG. 14 which is viewed from a different direction from those of each of FIGS. 15 to 17.

As shown in FIGS. 16, 17 and 18, as with the case of the insert mounting seat 102*a*, three insert mounting seats 102*b*2, 102*b*3, 102*b*4 are formed on the base end side of the insert mounting seat 102*b*, insert mounting seats 102*c*2, 102*c*3, 102*c*4 are formed on the base end side of the insert mounting seat 102*c*, and insert mounting seats 102*d*2, 102*d*3, 102*d*4 are formed on the base end side of the insert mounting seat 102*d*. As with the case of the insert mounting seats 102*a*2, 102*a*3, 102*a*4, the insert mounting seats 102*b*2, 102*b*3, 102*b*4 are also formed such that an insert mounting seat located closer to the base end of the tool body 101 is formed further backward with respect to the rotating direction of the indexable cutting tool 100. As with the case of the insert mounting seats 102*a*2, 102*a*3, 102*a*4, the insert mounting seats 102*c*2, 102*c*3, 102*c*4 are also formed such that an insert mounting seat located closer to the base end of the tool body 101 is formed further backward with respect to the rotating direction of the indexable cutting tool 100. As with the case of the insert mounting seats 102*a*2, 102*a*3, 102*a*4, the insert mounting seats 102*d*2, 102*d*3, 102*d*4 are also formed such that an insert mounting seat located closer to the base end of the tool body 101 is formed further backward with respect to the rotating direction of the indexable cutting tool 100. The cutting insert 1 is mounted on each of the insert mounting seats 102*b*2, 102*b*3, 102*b*4 such that the cutting edge 6*b* serves as an active cutting edge. The cutting insert 1 is mounted on each of the insert mounting seats 102*c*2, 102*c*3, 102*c*4 such that the cutting edge 6*c* serves as an active cutting edge. The cutting insert 1 is mounted on each of the insert mounting seats 102*d*2, 102*d*3, 102*d*4 such that the cutting edge 6*b* serves as an active cutting edge. In other words, as for any adjacent insert mounting seats in the circumferential direction of the tool body 101, the cutting inserts 1 are mounted thereon such that the nick rotational trajectories are shifted between such insert mounting seats.

Next, the effects provided by the cutting insert 1 of the present embodiment will be described below. The land 20 comprised in the cutting insert 1 is formed such that connecting parts (e.g., the end 18*p*) of the land between the nicks 18*a*, 18*b*, 18*c* and the major cutting edges 11*a*, 11*b*, 11*c* each have a greater width than that of any other portion thereof. Therefore, such connecting parts of the major cutting edges 11*a*, 11*b*, 11*c* with the nicks become more resistant to chipping than in the case of a conventional cutting insert with nicks. As described above, although the cutting edges become resistant to chipping, a portion of the land which is distant from a nick has a relatively smaller width, and therefore, the cutting ability will not be reduced. As a result, the indexable cutting tool 100 on which the cutting inserts 1 are mounted has a longer life than that of a conventional cutting tool, even under the same cutting conditions. Further, the cutting tool 100 is less likely to involve the occurrence of abnormal damage due to fracture, etc., than is the case in a conventional cutting tool, and therefore, such cutting tool 100 can achieve highly efficient machining with enhanced cutting conditions.

The major cutting edges 11*a*, 11, 11*c* are formed so as to be inclined, as described above, with respect to the middle plane M, and therefore, as shown in, for example, in FIG. 5, the portion 18*p*, being one of the intersections, between the nick 18*a* and the major cutting edge 11*a* (see the portion surrounded by a circle V in FIG. 5), i.e., a portion distant from the related corner cutting edge, forms an acute angle with the major cutting edge 11*a*. In a conventional cutting insert, such portion is very prone to fracture; meanwhile, in the cutting insert 1, the portion 20' of the land, which extends over such portion, has a greater width than that of the other portion thereof, and the portion has a sufficient strength and is resistant to chipping.

The present invention has been described above, taking an embodiment of the invention as an example. However, the present invention is not limited to the above-described embodiment. For example, the upper surface and the lower surface do not have to be formed in a substantially triangular shape in the above-described embodiment, and they may be formed in other substantially polygonal shapes, such as a substantially quadrangular shape and a substantially pentagonal shape. In other words, the basic shape of the upper surface and the lower surface may be an n-gonal shape of n-fold rotational symmetry. It should be noted that "n" represents an integer of 3 or higher.

The cutting insert of the above-described embodiment, which is served by a positive-type cutting insert, may instead be a negative-type cutting insert. In such case, cutting edges may also be formed in an intersecting edge between the lower surface and the peripheral side surface. Further, nicks may be formed in the cutting edges on the lower surface side, and as described above, a land may be formed along the cutting edges such that portions of the land which are adjacent to end areas of the nicks have a relatively wide width.

In the above-described embodiment, the insert mounting seats 102 are formed in four sections in the circumferential direction of the tool body 101, each having four segments in the rotational axis direction. However, the number of the insert mounting seats and the arrangements therefor are not limited thereto. For example, the insert mounting seats may be formed in the circumferential direction of the tool body in another number of sections, such as one section, two sections, three sections or five sections, and also in another number of segments, such as one segment, two segments, three segments or five segments.

The present invention includes modifications, applications and equivalents encompassed by the idea of the present invention defined by the scope of the claims.

What is claimed is:

1. A cutting insert (1), comprising:
a first end surface (2);
a second end surface (3) opposing the first end surface;
a peripheral side surface (4) connecting the first end surface and the second end surface;
a cutting edge (6) extending along an intersecting edge between the first end surface and the peripheral side surface;
a land (20) formed in the first end surface so as to extend along the cutting edge; and
at least one groove (18) formed in the peripheral side surface, each groove forming an opening (18o) in the first end surface and being formed so as to separate the cutting edge into a plurality of portions,
wherein, when the cutting insert is viewed from a direction facing the first end surface, the land is formed such that a portion of the land which is adjacent to an end area (S) of the groove has a greater width than a width of a portion of the land which is distant from the groove, and
wherein:
the first surface has a substantially polygonal shape and comprises a plurality of corners (9, 10);
when the cutting insert is seen from a side view, the intersecting edge between the first end surface and the peripheral side surface comprises an inclined cutting edge portion (11) which extends between the two adjacent corners and which is inclined so as to be closer to the second end surface from, from among the two corners, one corner (9) to the other corner (10); and
the at least one groove is formed so as to separate the inclined cutting edge portion into a plurality of portions.

2. The cutting insert (1) according to claim 1, wherein the end area (S) includes an end (18p) of the opening (18a) which forms an acute angle with the inclined cutting edge portion when the cutting insert is seen from a side view.

3. The cutting insert (1) according to claim 1, wherein, when viewed from the direction facing the first end surface, the first end surface forms a substantially n-gonal shape and has a shape of n-fold rotational symmetry, n being an integer of 3 or higher.

4. A cutting insert (1), comprising:
a first end surface (2);
a second end surface (3) opposing the first end surface;
a peripheral side surface (4) connecting the first end surface and the second end surface;
a cutting edge (6) extending along an intersecting edge between the first end surface and the peripheral side surface;
a land (20) formed in the first end surface so as to extend along the cutting edge; and
at least one groove (18) formed in the peripheral side surface, each groove forming an opening (18o) in the first end surface and being formed so as to separate the cutting edge into a plurality of portions,
wherein, when the cutting insert is viewed from a direction facing the first end surface, the land is formed such that a portion of the land which is adjacent to an end area (S) of the groove has a greater width than a width of a portion of the land which is distant from the groove, and
wherein:
the intersecting edge between the first end surface and the peripheral side surface is provided with at least two cutting edges including a first cutting edge (6a) and a second cutting edge (6b), and
the at least one groove in the first cutting edge and the at least one groove in the second cutting edge are asymmetric around an axis extending in an insert thickness direction which is defined so as to intersect with both the first end surface and the second end surface.

5. A cutting insert (1) comprising:
an upper surface (2), a lower surface (3) and a peripheral side surface (4) connecting the upper and lower surfaces, the peripheral side surface (4) comprising at least three major side surfaces (15a, 15b, 15c);
a mounting hole (5) having a central axis (NA) and passing between the upper and lower surfaces;
a middle plane (M) located between the upper surface (2) and the lower surface (3), the middle plane (M) being perpendicular to the central axis (NA);
at least three major cutting edges (11a, 11b, 11c), each formed at an intersection of the upper surface (2) with an associated one of the at least three major side surfaces (15a, 15b, 15c);
a plurality of grooves (18) formed in each of the major side surfaces (15a, 15b, 15c) and extending in a thickness direction of the cutting insert, the plurality of grooves dividing an associated major cutting edge into a plurality of portions;

a land (20) formed in the upper surface (2), the land (20) extending along each major cutting edge (11a, 11b, 11c);

wherein, in a planar view of the insert's upper surface:
the land has a varying land width;
each groove is bordered by two end areas (S) located at connecting portions between said each groove and adjacent portions of the associated major cutting edge; and
a land width (w2) at a given end area (S) is greater than a land width (w1) at distant locations on an adjacent portion of the associated major cutting edge, and wherein in said planar view of the insert's upper surface:
for a given groove (18), land widths (w2) at the two end areas (S) bordering that groove are greater than land widths (w3) at locations along the groove (18) between the two end areas (S).

6. The cutting insert according to claim 5, wherein:
the cutting insert is a positive-type cutting insert with cutting edges formed only at an intersection of the upper surface (2) with the peripheral side surface (4).

7. The cutting insert according to claim 5, comprising:
at least three cutting edge sets (6) formed at an intersection of the upper surface (2) and the peripheral side surface (4), wherein:
each cutting edge set (6) comprises one of said major cutting edges (11a, 11b, 11c), a minor cutting edge (12a, 12b, 12c) and a corner cutting edge (13a, 13b, 13c) connecting the major and minor cutting edges.

8. The cutting insert according to claim 7, comprising:
three raised corners (9a, 9b, 9c) alternated with three lowered corners (10a, 10, 10c);
and wherein:
in a side view of any one of the major side surfaces (15a, 15b, 15c), the associated major cutting edge (11a, 11b, 11c) is inclined relative to the middle plane, between an associated raised corner (9a, 9b, 9c) and an associated lowered corner (10a, 10b, 10c).

9. The cutting insert (1) according to claim 8, wherein:
each groove forms an opening (18o) in the upper surface (2); and
in said side view of any one of the major side surfaces (15a, 15b, 15c), each end area (S) includes an end (18p) of the opening which forms an acute angle with the associated inclined major cutting edge.

10. The cutting insert according to claim 7, wherein:
a distance from a given corner cutting edge (13a, 13b, 13c) to the closest groove of an associated major cutting edge (11a, 11b, 11c) varies among said cutting edge sets (6).

11. The cutting insert according to claim 7, comprising:
exactly three cutting edge sets (6).

12. The cutting insert (1) according to claim 5, wherein:
the cutting insert is indexable about the central axis (5A);but
in said planar view of the insert's upper surface (2), the upper surface is rotationally asymmetric about the central axis (NA).

13. The cutting insert (1) according to claim 5, wherein, in a side view of any one of the major side surfaces (15a, 15b, 15c):
each of said plurality of grooves (18) has a tapered shape such that a width thereof becomes narrower toward the lower surface (3); and
each of said plurality of grooves (18) is inclined with respect to the middle plane (M), in the thickness direction of the cutting insert.

14. The cutting insert (1) according to claim 4, wherein the end area (S) includes an end (18p) of the opening (18a) which forms an acute angle with the inclined cutting edge portion when the cutting insert is seen from a side view.

15. The cutting insert (1) according to claim 4, wherein, when viewed from the direction facing the first end surface, the first end surface forms a substantially n-gonal shape and has a shape of n-fold rotational symmetry, n being an integer of 3 or higher.

* * * * *